United States Patent Office 3,503,908
Patented Mar. 31, 1970

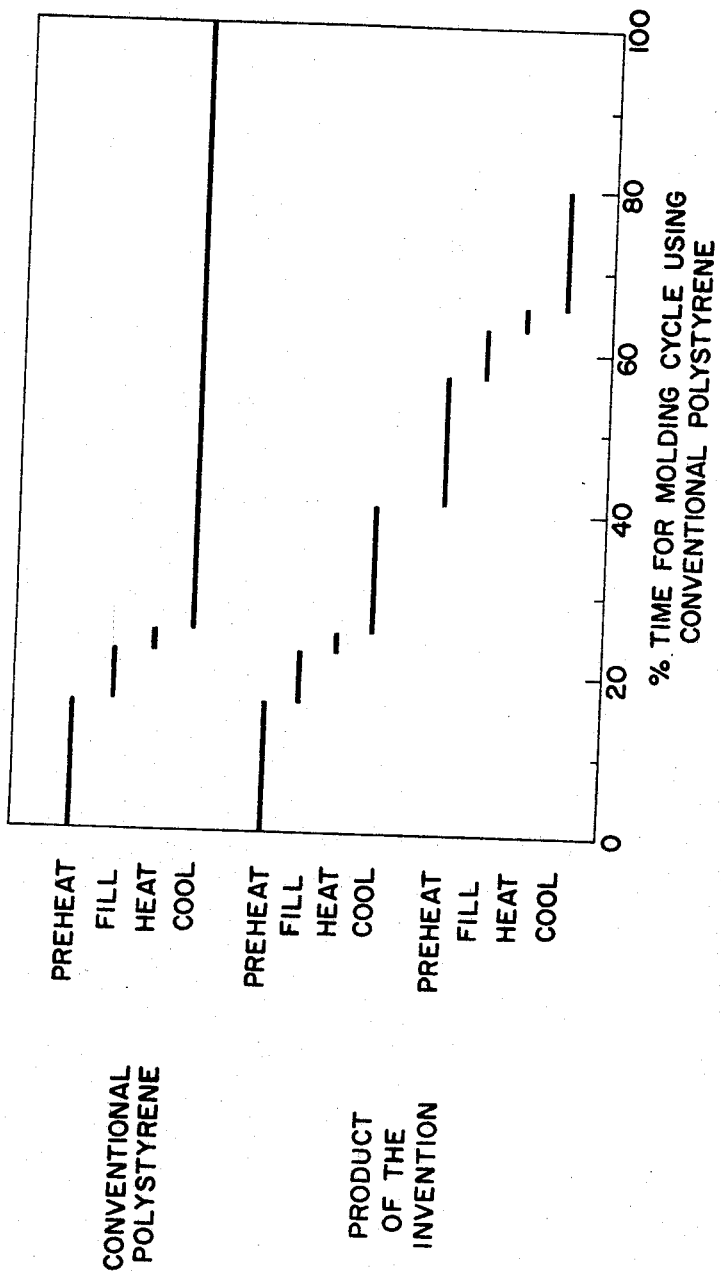

3,503,908
METHOD OF MAKING EXPANDABLE POLYMERS
Alvin R. Ingram and Harold A. Wright, Murrsville, Pa. (both % Koppers Company Inc., 440 College Park Drive, Monroeville, Pa. 15146)
Continuation of application Ser. No. 657,360, July 31, 1967. This application Feb. 28, 1969, Ser. No. 805,997
Int. Cl. C08d *13/10;* C08j *1/26*
U.S. Cl. 260—2.5                                                                      7 Claims

ABSTRACT OF THE DISCLOSURE

Carrying out the impregnation of blowing agents such as n-pentane into styrene polymer particles, which are suspended in water, in the presence of polyoxyethylene mono-ethers and mono-esters such as polyoxyethylene sorbitan monolaurate reduces the mold cooling time required when the particles are molded into a foamed structural unit.

REFERENCE TO RELATED APPLICATIONS

This application is a continuation of our co-pending application Ser. No. 657,360, filed July 31, 1967, which was, in turn, a continuation-in-part of our co-pending application therewith, Ser. No. 378,177, filed June 26, 1964, now United States Patent No. 3,389,097.

BACKGROUND OF THE INVENTION

The making of low-density, cellular, shaped, plastic articles from expandable particles, granules, or beads of thermoplastic material such as styrene polymers is well-known. Such particles generally contain a blowing agent which boils below the softening point of the thermoplastic material which will cause the particles to expand when they are subjected to heat. These particles are placed in a mold cavity which defines the shape of the desired finished article. The particles are heated above their softening point, for example, by steam or other suitable heating media injected under pressure into the mold cavity, whereupon the particles expand to fill the mold cavity and fuse together.

The particles can be either placed directly into the mold or they can be pre-expanded before being placed in the mold as, for example, as described in United States Patent No. 3,023,175.

Thermoplastic expandable polymer particles have worked well in the above molding process to form a wide variety of articles. However, after the particles have been heated in the mold to form the desired article, the article must be cooled for a relatively long period of time, depending upon the thickness of the article, before it can be removed from the mold in a self-supporting state to retain its shape outside the mold. Foamed plastic has good insulation quanlities, so the cooling time for the article consumes a large part of the molding cycle and greatly restricts the number of articles that can be produced from a mold in a given period of time.

The cooling time is not appreciably shortened by applying cooling media to the surface of the article or to the mold surface since the heat transfer through the article is extremely slow. This low heat transfer rate is, in fact, one of the properties which makes these articles useful, for example, for insulation. If the articles are removed from the mold too soon, the combination of the softness of the thermoplastic material and the pressure due to the hot interior of the article will cause the article to bulge and thereafter not have the desired shape.

In our copending applicaton, Ser. No. 378,177, filed June 26, 1964, a process is described whereby the mold cooling time is reduced by the addition, at the appropriate time, of a fatty acid bis-amide to the particles during polymerization in aqueous suspension. While this process is successful in reducing the cooling time, it does have certain disadvantages. If the bis-amide is not thoroughly dispersed in the aqueous suspension, then agglomerates of the bis-amide will form in the aqueous phase. These agglomerates being of a similar size to the polymer particles cannot be removed from the product by screening and thus adulterate the product. When the particles are then molded, the presence of the bis-amide agglomerates causes discoloration of the foam and poor fusion.

Surprisingly, we have now found that the cooling time of the molded article that is made from the particles can be reduced without the abovementioned disadvantages by the preesnce of certain polyoxyethylene mono-esters and mono-ethers when the particles are impregnated with the blowing agent.

BRIEF SUMMARY OF THE INVENTION

In accordance with this invention, vinyl aromatic polymers are impregnated with blowing agents in the presence of a compound selected from the group consisting of polyoxyethylene mono-esters, polyoxyethylene sorbitan mono-esters and polyoxyethylene mono-ethers where said compounds have an HLB number (hydrophile-lipophile balance) of at least about 15.

The impregnation can take place either during the polymerization of vinyl aromatic monomer after the bead identity point has been reached but before complete polymerization has taken place (soft bead impregnation) or after the polymerization of vinyl aromatic monomer has been substantially completed (hard bead impregnation).

During a bead-susepnsion polymerization in water, the individual monomer droplets tend to stick together during the first part of the polymerization to form larger droplets. When the polymerization has proceeded to a sufficient degree, the droplets become hard and no longer coalesce and grow. This is termed the bead identity point. This point will vary from about 35–75 percent conversion depending upon the suspending system, the monomer or monomers, and the degree of agitation.

DESCRIPTION OF THE DRAWING

The figure compares, by chart, a molding cycle using a conventional expandable polystyrene with a molding cycle using the product of the invention.

DETAILED DESCRIPTION

In order to provide expandable particles which, upon molding, will produce a foam structure having a short cooling time, the impregnation of the blowing agent into the polymer particles is carried out in the presence of compounds which are polyoxyalkylene derivatives. Compounds which are useful in the invention are: polyoxyethylene sorbitan mono-esters of fatty acids, polyoxyethylene mono-esters of fatty acids, and polyoxyethylene mono-ethers of long-chain alcohols. The compounds contain an average of from about 15–40 moles of ethylene oxide per molecule in the polyoxyethylene moiety. The fatty acid and alcohol portion are derived from those acids and alcohols having from 10–18 carbon atoms.

To be useful in the process of the invention, the compounds must have an HLB number at least about 15. If the HLB number is below about 15, then even dispersion of blowing agent in the beads cannot be obtained, and the beads may even agglomerate during impregnation due to the build up of excess blowing agent on the surface of the beads. The HLB number is defined as the hydrophile-lypophile balance (see W. C. Griffin; J. Society Cosmetics Chemists 1, 311 (1949) and Becker;

Emulsions, Theory and Practice, 2nd Edition, page 233). While the HLB number can be determined experimentally by the process described by Griffin in the above-mentioned article, it can also be calculated using various formulas. For example, $$HLB = 20\left(1 - \frac{S}{A}\right)$$

where S is the saponification number of the ester and A is the acid number of the acid. Where it is difficult to get good saponification number data, the relation $$HLB = \frac{E+P}{5}$$

is used where E is the weight percentage of oxyethylene content and P is the weight percentage of the polyhydric alcohol content. In products where only ethylene oxide is present in the hydrophilic portion and for fatty alcohol-ethylene oxide condensation products, the last equation may be reduced to $$HLB = \frac{E}{5}$$

Suitable compounds include polyoxyethylene sorbitan mono-esters of fatty acids such as, polyoxyethylene sorbitan monolaurate, polyoxyethylene sorbitan monooleate, polyoxyethylene sorbitan monopalmitate; polyoxyethylene mono-esters of fatty acids such as polyoxyethylene monolaurate, polyoxyethylene monostearate; and polyoxyethylene mono-ethers such as polyoxyethylene monolauryl ether, polyoxyethylene monocetyl ether, and polyoxyethylene monooleyl ether.

The polyoxyethylene compounds must be used in amounts sufficient to provide good dispersion of the blowing agent or about 0.15 weight percent based on polymer. On the other hand, amounts of more than 0.25 weight percent serve no useful purpose.

When the polyoxyethylene compound is added during the polymerization of the beads (soft bead impregnation), it should not be added prior to reaching the bead identity point. Addition prior to reaching the bead identity point may interfere with the bead suspension system and even result in agglomeration of the particles during the impregnation of the beads with blowing agent.

Polymerizing monomers in an aqueous suspension to produce polymer particles is a well-known operation. The monomer or mixture of monomers and a free-radical initiator in the form of an oil phase are admixed with water and heated. The mixture is stirred or agitated so that the oil phase is in the form of small individual droplets. After the polymerization has progressed to a certain point, which varies depending upon the nature of the monomer or monomers, the droplets tend to become sticky so that stirring alone is insufficient to keep the droplets from coalescing. It is, therefore, necessary to have a suspending or stabilizing agent present in the polymerization mixture. Examples of suitable stabilizing agents are polyvinyl alcohol and hydroxyethyl cellulose, etc.

The temperature for the polymerization must be high enough so that the polymerization occurs at a reasonable rate, depending upon the catalyst system used, with the preferred temperature range being between about 70° and 120° C.

Typical free-radical initiators are oil soluble, free-radical catalysts, such as benzoyl peroxide, t-butyl perbenzoate, lauroyl peroxide and azobisisobutyronitrile.

Addition of the polyoxyethylene compound where the particles have been completely polymerized (hard bead impregnation) can be made to the aqueous suspension in which the particles were prepared. Alternatively, the particles can be separated from the aqueous suspension, for example, in order to remove any offsize particles by screening prior to impregnation with blowing agent, and then resuspended in water.

Where the particles are resuspended, suspending agents are added to the water to keep the particles from agglomerating at the elevated temperatures employed during the impregnation process. Suitable suspending agent systems are, for example, those described in D'Alelio Patent 2,983,692, such as tricalcium phosphate in combination with an ionic surface active agent.

The impregnation is conventionally carried out at temperatures ranging from about 80° to 150° C. Increasing the temperatures makes the impregnation proceed at a faster rate.

The blowing agents are compounds which are gases or which will produce gases on heating. Preferred blowing agents include aliphatic hydrocarbons containing from 1–7 carbon atoms in the molecule, for example, methane, ethane, propane, butane, pentane, hexane, heptane, cyclohexane, and their halogenated derivatives which boil at a temperature below the softening point of the polymer.

Our invention is further illustrated by, but not limited to, the following examples wherein parts are parts by weight unless otherwise indicated.

Example I

To a 2500-gallon reactor there was charged consecutively 100 parts of styrene (10,000 pounds), 5 parts of low molecular weight polystyrene resin (softening point 122° C.; viscosity of 30% solution in toluene 2.3 centistokes), 0.47 part of benzoyl peroxide, 0.10 part of t-butyl perbenzoate, 102 parts of water, and 0.10 part tetrasodium pyrophosphate. The mixture was stirred by a three-bladed impeller at a speed of 65 r.p.m., heated to 92° C. and maintained at that temperature. Approximately 80 minutes after reaching 92° C., 0.10 part of hydroxyethyl celllulose was added and the impeller speed was increased to 80 r.p.m. Between 5 and 10 minutes after the addition of the hydroxyethyl cellulose, when it was determined by sample that approximately 40% of the monomer had been converted to polymer, there was added a slurry of 0.40 part of ethylene-bis-stearamide contained in styrene (prepared by stirring 0.4 part of amide with 1.5 parts of styrene) and the temperature was continued to be maintained at 92° C. for an additional 360 minutes. The particles were then impregnated with blowing agent by adding 0.20 part of polyoxyethylene sorbitan monolaurate as a stabilizer for the blowing agent and 8.5 parts of n-pentane to the polymerization mixture. The polymerization was completed by raising the temperature to 115° C. and maintained there for 420 minutes. Thereafter, the mixture was cooled to room temperature and the granules removed, washed, and dried.

Example II

An aliquot of the granules prepared in Example I were pre-expanded in a Rodman Pre-expander U.S. (3,023,175) to a density of 0.98 p.c.f. The granules' anti-lumping characteristics were good (1.0%). Polystyrene granules prepared as in Example I but without the addition of ethylene-bis-stearamide pre-expanded to the same density but produced an excessive amount (6.0%) of lumps.

Portions of the granules so pre-expanded were molded into 20 x 20 x 12" foam blocks by placing the granules in a conventional mold consisting of a porous mold cavity surrounded by a steam chest. Steam at 30 p.s.i.g. was introduced into the steam chest to cause the granules to expand and fuse together. After the steam was shut off, cooling water was circulated through the steam chest. (As used hereinafter, the term "foam cooling time" is defined as the time it is necessary to circulate the cooling water at 30° C. through the steam chest before the block is self-supporting and will not expand when it is removed from the mold cavity.) Blocks molded from these granules were self-supporting and could be removed from the mold after 1.5 to 2 minutes foam cooling time.

Example III

Example II was repeated except that instead of using beads prepared in Example I, a readily available commercial product F40 Dylite® expandable polystyrene was employed. 20 x 20 x 12" blocks molded from the commercial product required 20–30 minutes foam cool time.

Example IV

To a 100-gallon Pfaudler kettle there was charged in sequence 102 parts of water, 0.1 part of tetrasodium pyrophosphate, 105 parts of styrene, 0.37 part benzoyl peroxide and 0.10 part of t-butylperbenzoate. The mixture was stirred at an impeller speed of 80 r.p.m., heated to 92° C., and 45 minutes after the temperature reached 92° C. or at approximately 30% conversion as determined by sample 0.30 part of methylene-bis-stearamide was added in the form of a finely divided dry powder. Hydroxyethyl cellulose, 0.10 part, was added 30 minutes after the addition of the methylene-bis-stearamide and the impeller speed increased to 110 r.p.m. After the polymerization had continued at 92° C. for the total time of 360 minutes, the temperature was raised to 115° C. for a total of 240 minutes in order to complete the polymerization. The product polymer granules were recovered from the polymerization mixture, washed, and air dried. The polymerized granules were resuspended in a 100-gallon Pfaudler kettle in 100 parts of water using 0.2 part of polyoxyethylene sorbitan monolaurate and 0.05 part of hydroxyethyl cellulose as the suspending agents. Pentane, 8.0 parts, was added to the suspension and the suspension stirred for 7 hours at a temperature between 90–100° C. after which the suspension was cooled to 40° C. and the product polymer granules containing the pentane dispersed therein recovered, washed, and air dried. The product granules had good anti-lumping (2% lumps) on pre-expansion. Blocks molded from the granules in accordance with the procedure set forth in Example II gave a foam cool time of 3–4 minutes.

Example V

To a reactor equipped with a three-bladed impeller there was charged consecutively 100 parts of styrene monomer, 0.35 part of the catalyst comprising 0.30 part of benzoyl peroxide and 0.05 part of t-butyl perbenzoate, 102 parts of water and 0.10 part of tetrasodium pyrophosphate. The mixture was stirred by a three-bladed impeller at a speed of 65 r.p.m., heated to 92° C. and maintained at that temperature. Approximately 80 minutes after reaching 92° C., 0.10 part of hydroxyethyl cellulose was added and the impeller speed was increased to 80 r.p.m. The temperature was maintained at 92° C. for an additional 360 minutes at which time it was determined by sample that approximately 90 percent of the monomer had been converted to polymer. There was then added to the suspension 0.20 part of polyoxyethylene sorbitan monolaurate containing an average of 20 moles of ethylene oxide per molecule and having an HLB number of 16.7 after which the addition of the blowing agent 8.5 parts of n-pentane was commenced. The addition of the pentane took 120 minutes after which time the polymerization was completed by raising the temperature to 115° C. and maintaining it therefor 420 minutes. Thereafter the mixture was cooled to room temperature and the granules separated by centrifuge, washed with water, and dried with air at room temperature.

Example VI

An aliquot of the granules prepared in Example V were pre-expanded in a Rodman pre-expander (U.S. 3,023,175) to a density of 1.10 p.c.f.

Portions of the granules so pre-expanded were molded into 20 x 20 x 12" foam blocks by placing the granules in a non-perforated ring-mold supported on a vertically-movable perforated steam chest. The chest was raised until the mold pressed tightly against the bottom of another perforated steam chest. Steam at 30 p.s.i.g. was introduced into the mold to cause the granules to expand and fuse together. After steam was shut off, cooling water was circulated through the steam chest. Blocks molded from these granules were self-supporting and could be removed from the mold after 6 minutes foam cooling time as defined in Example II.

Example VII

In order to illustrate the process of the invention using a hard bead impregnation, the following procedure was carried out:

To a reactor equipped with a three-bladed impeller, there was added in the following order 100 parts of water, 1 part tricalcium phosphate, 0.01 part Nacconol 90-F (sodium dodecyl benzene sulfonate), 0.2 part of polyoxyethylene sorbitan monolaurate, containing an average of 20 moles of ethylene oxide per molecule and having an HLB number of 16.7, 100 parts of Dylene-8 polystyrene (a commercial brand of polystyrene) beads having a particle size of predominantly through 16 and 25 mesh U.S. Standard Sieve. The mixture was stirred at 110 r.p.m. and heated during 85 minutes to 90° C. when the addition of 9.2 parts of the blowing agent, n-pentane, was started. The pentane addition took 180 minutes at 90° C. after which time the temperature was raised to 110° C. and maintained at 110° C. for 180 minutes. The suspension was cooled to room temperature and acidified to a pH of 1.4 with HCl. The beads were separated from the aqueous phase by centrifuge, washed with water, and air dried at room temperature. The beads were pre-expanded in accordance with the procedure of Example II to a density of 1.38 p.c.f. Aliquots of the pre-expanded beads were molded into foam blocks 20 x 20 x 12" which had good fusion, and which were self-supporting and could be removed from the mold after a foam cooling time of 12.5 minutes.

Example VIII

There were charged to a reactor equipped with a three-bladed impeller in the following sequence: 100 parts of water, the suspending agents, 0.94 part of tricalcium phosphate and 0.013 part of Nacconol NRSF (dodecyl benzene sodium sulfonate), 100 parts of Dylene-8 polystyrene (a commercial brand of polystyrene) beads having a particle size of predominantly through 16 and on 25 mesh U.S. Standard Sieve. The mixture was stirred at 110 r.p.m. and heated during 85 minutes at 90° C. when the addition of 9.2 parts of the blowing agent, n-pentane, was started. The pentane addition took 180 minutes at 90° C. after which time the temperature was raised to 110° C. during 30 minutes and maintained at 110° C. for 180 minutes. The suspension was cooled to room temperature and acidified to a pH of 1.4 with HCl. The beads were separated from the aqueous phase by centrifuge, washed with water, and air dried at room temperature. The beads were pre-expanded in accordance with procedure of Example II to a density of 1.35 p.c.f. Aliquots of the pre-expanded beads were molded into foam blocks 20 x 20 x 12" which had good fusion but which were self-supporting, and could be removed from the mold only after a foam cooling time of 25–30 minutes.

Example IX

The process of Example VII was repeated using in place of the polyoxyethylene sorbitan monolaurate, 0.15 part of polyoxyethylene monostearate having an HLB number of 17.9 and an average ethylene oxide content of 50 moles per molecule. The foam blocks molded from the impregnated beads in accordance with the procedure of Example II had a foam cool time of 10 minutes.

Example X

The process of Example VII was repeated using in place of the polyoxyethylene sorbitan monolaurate, polyoxyethylene monotridecyl ether having an HLB number of 15.4 and an average ethylene oxide content of 15 moles per molecule. Beads impregnated in accordance with this procedure were pre-expanded and molded in accordance with the procedure of Example II. The foam blocks had a foam cool time of 14 minutes.

Example XI

The procedure of Example V was repeated using in place of the polyoxyethylene sorbitan monolaurate, polyoxyethylene monostearate having an average ethylene oxide content of 8 moles per molecule and an HLB number of 11.1. During the addition of the n-pentane, the polymer particles agglomerated into lumps rendering them unsuitable for molding.

In accordance with this invention, a variety of expandable thermoplastic homopolymers and copolymers can be prepared which are derived from vinyl aromatic monomers including styrene, divinylbenzene, vinyl toluene, isopropylstyrene, alpha-methylstyrene, nuclear dimethylstyrenes, chlorostyrene, vinylnaphthalene, etc., as well as polymers prepared by the copolymerization of a vinyl aromatic monomer with monomers such as butadiene, alkyl methacrylates, alkyl acrylates, and acrylonitrile wherein the vinyl aromatic monomer is present in at least 50% by weight. For the purposes of convenience, these polymers are referred to herein as styrene polymers.

The production of articles having a foamed polymer structure involves generally a molding cycle that includes preheating the mold, charging the mold with expandable polymeric particles, heating the granules in the mold, and then cooling the resulting foamed structure to a temperature at which the material is self-supporting and will retain its shape. The time consumed in a typical molding cycle as carried out heretofore breaks down as follows:

Preheating requires about 16% of the time of the cycle;
Filling the mold requires about 6% of the cycle;
Heating the polymeric granules requires about 2% of the cycle; and
Cooling the finished article so that it can be removed from the mold requires about 76% of the time.

By practice of this invention expandable polymer granules can be produced which allow a startling reduction to be made in the portion of the molding cycle needed for cooling the finished article. The cooling time is reduced to about one-fifth to one-half that required using conventional expandable polymer granules. Since the preheating, mold filling, and granule heating time remain the same, the overall mold cycle time is greatly reduced. This means that by using the product of the invention about twice as many articles can be produced from the same piece of molding equipment in a given period of time as compared with the production of articles by the use of the heretofore known expandable polymers. The savings in molding cycle time made possible by this invention is demonstrated in the drawing.

What is claimed is:

1. In a process for making expandable polystyrene particles in which polystyrene particles are maintained in stable aqueous suspension by the presence of a suspending agent and which may be extended by a surface-active agent and are thereafter impregnated with a blowing agent, the improvement comprising: subsequently adding to the aqueous suspension of polystyrene particles, previously stabilized by the suspending agent, a surface-active agent different from any previously added surface-active agent selected from the group consisting of polyoxyethylene mono-esters of fatty acids, polyoxyethylene sorbitan mono-esters of fatty acids, and polyoxyethylene mono-ethers of fatty alcohols where said compounds have an HLB number of at least about 15; and impregnating a blowing agent into said particles in the presence of said compound in said aqueous suspension; whereby said expandable polystyrene particles will produce, upon molding, a foam structure having a short cooling time.

2. The process of claim 1 wherein said compound has an average ethylene oxide content per molecule of from about 15–40 moles.

3. The process of claim 1 wherein the fatty acid or fatty alcohol portion comprises those fatty acids and fatty alcohols containing from 10–18 carbon atoms.

4. The process of claim 1 wherein said compound is present in amounts of from about 0.15 to 0.25 weight percent based on the weight of said particles.

5. The process of claim 1 wherein the impregnation takes place prior to the time that said polystyrene particles have been substantially completely polymerized.

6. The process of claim 5 wherein said suspending agent is selected from polyvinyl alcohol and hydroxyethyl cellulose.

7. The process of claim 1 wherein said polystyrene particles are substantially completely polymerized and are suspended in said aqueous suspension by a tri-calcium phosphate and ionic surface-active agent combination suspending agent system.

References Cited

UNITED STATES PATENTS

| | | |
|---|---|---|
| 2,797,443 | 7/1957 | Carlson. |
| 2,983,692 | 5/1961 | D'Alelio. |
| 3,039,977 | 6/1962 | Ingram. |
| 3,058,927 | 10/1962 | McMaster et al. |
| 3,143,532 | 8/1964 | Kahrs et al. |

MURRAY TILLMAN, Primary Examiner

M. FOELAK, Assistant Examiner

U.S. Cl. X.R.

260—93.5; 264—53